Inventor
Vincent S. De Marchi
by Bair, Freeman & Molinare Attys.

Patented Oct. 20, 1953

2,656,267

UNITED STATES PATENT OFFICE 2,656,267

METALLURGICAL PROCESS

Vincent S. de Marchi, Chicago, Ill., assignor, by mesne assignments, to Inland Steel Company, Chicago, Ill., a corporation of Delaware Original application May 10, 1945, Serial No. 592,955. Divided and this application October 11, 1950, Serial No. 189,542

2 Claims. (Cl. 75—28)

This invention relates to a metallurgical process involving the treatment of various materials with boron trifluoride ($BF_3$) at an elevated temperature, and is a division of application Serial No 592,955 filed May 10, 1945, now Patent No. 2,530,391, granted November 21, 1950. I have found that boron trifluoride reacts at temperatures upwards of 200° F. with compounds of silicon, titanium, phosphorus, vanadium, columbium, arsenic, antimony, tantalum, molybdenum, tungsten, uranium, and the like, to form volatile compounds which can be swept away by additional amounts of boron trifluoride or other gases. Thus, said elements may be separated in volatile form from other substances with which said elements may be admixed but which do not react with boron trifluoride at said reaction temperature to form volatile compounds, for instance, iron, nickel, cobalt, copper, and oxides thereof. No boron is thereby introduced into the residual solid material, for boron is continuously removed during the course of the treatment in the form of gaseous boron oxyfluoride $(BOF)_3$.

The methods of the present invention are therefore applicable to the treatment of ores and other material containing compounds of columbium, arsenic, antimony, tatalum, molybdenum, tungsten, uranium, and the like, for the purpose of isolating these elements in the form of their volatile fluorides, which may then be decomposed and/or further treated, when it is desired to isolate these elements.

The methods of the present invention are further applicable to the separation, from titanium- or vanadium-containing ores and material, of these two elements, which may then be isolated from their volatile fluorine compounds. Further, titanium and vanadium may also be removed from titanium- or vanadium-containing iron ores or other ferruginous material when it is desired to prepare metallic iron free from titanium or vanadium.

The methods of the present invention are of particular interest in connection with the removal of silicic matter from ferruginous material, being especially applicable to the removal of silica from metallic iron obtained from silica-containing ores or oxides by reduction at a temperature below the fusion point of the iron (sponge iron); and to the removal of silicon that may be present in cast iron or the like in the form of iron silicide. Complete separation of silicic matter may be effected from finely or coarsely divided iron or other ferruginous material, and, if desired, only superficial removal from larger particles.

An important object of the present invention is to provide a method for separation of silicic matter from ferruginous material by the action of boron trifluoride.

Another important object of the present invention is to provide a continuous method of the nature indicated involving the step of regenerating boron trifluoride.

Other and further objects and features of the present invention will become apparent from the following detailed description and the appended claims.

For proceeding according to the present invention, boron trifluoride may conveniently and inexpensively be generated from 100 parts by weight anhydrous rasorite

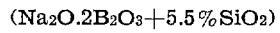

242 parts by weight fluorspar ($CaF_2$), and 181 parts by weight of silica ($SiO_2$). These materials react at about 1600° F. to yield 120 parts by weight boron trifluoride, 37 parts by weight sodium fluoride (NaF) and 360 parts by weight of a solid residue consisting of $CaO.SiO_2$. The course of the reaction is indicated by the following equations

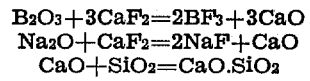

Other $B_2O_3$ containing materials than rasorite may be substituted therefor.

The boron trifluoride, being a gas, may be led directly to a fluorination chamber or to a gas holder. The solid products of the reaction are recovered separately and the sodium fluoride is extracted with water. The resulting sodium fluoride solution is separated from the calcium silicate by filtration and subjected to evaporation for recovering solid sodium fluoride which may be returned to the boron trifluoride generator for conversion into boron trifluoride.

Figure 1:
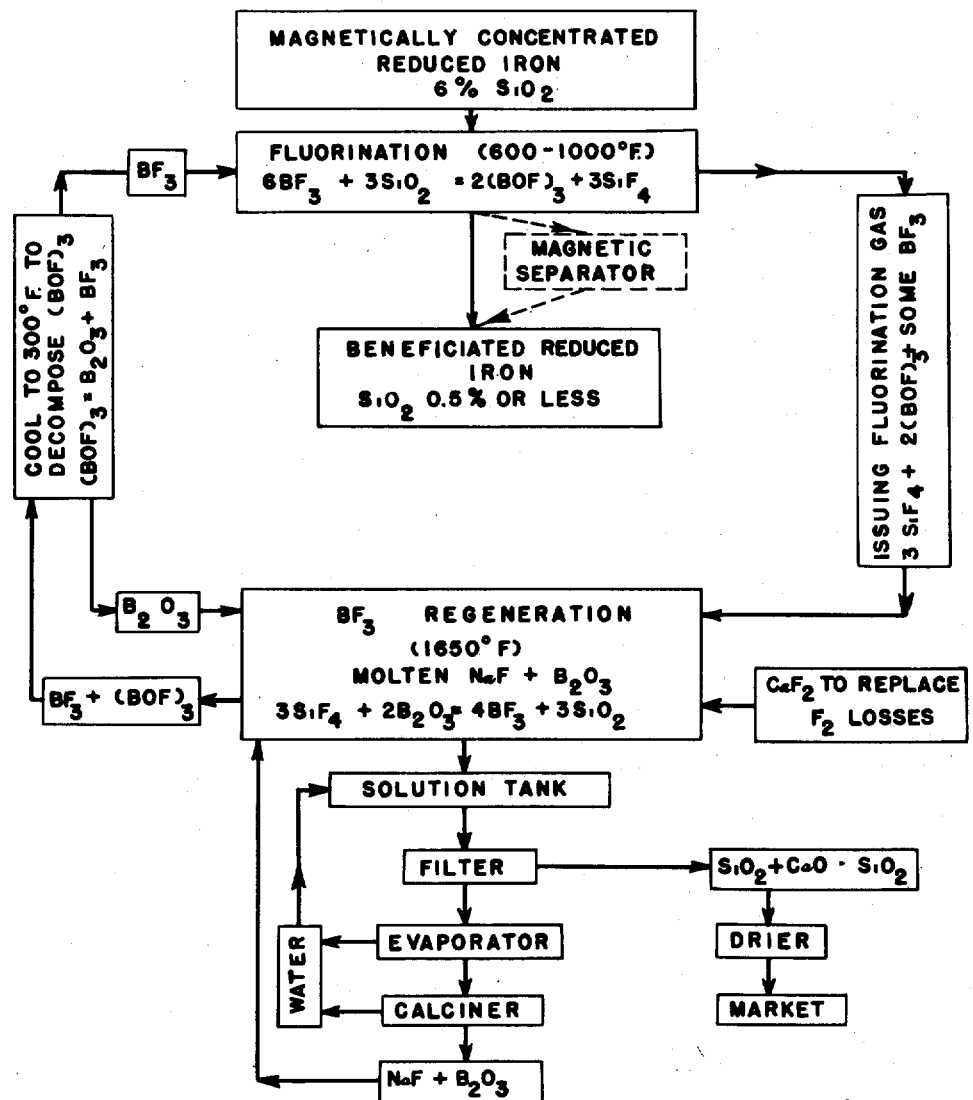
Figure 1 is a flow sheet illustrating a process for removing silica from iron with boron trifluoride and for regenerating the boron trifluoride in accordance with the invention.

Boron trifluoride generated as described hereinabove or derived from other sources may be applied to the separatory removal of the hereinabove mentioned elements from mixtures of said elements or compounds thereof with other elements or compounds. In order to illustrate the application of boron trifluoride for the purposes disclosed, I have described hereinbelow in detail my method for the removal of silica from flue dust containing 10.3% silica and reduced to metallic iron by the method disclosed and claimed in the application of John C. Kalbach, Vincent S. de Marchi and Frederick W. Sullivan, Jr., entitled "Method of Reducing Metallic Oxides," Serial 549,914, filed August 17, 1944. As shown in the flowsheet of Figure 1, the flue dust is initially subjected to reduction with hydrogen gas in fluidized condition at about 1100° F. The reduced product is subjected to a conventional magnetic separation for reducing its silica content to 6%, the non-magnetic fraction being discarded. The magnetic fraction is subjected to the action of boron trifluoride, say, at 600° to 1000° F. for a time sufficient to reduce its silica content to 0.5% or less. The boron trifluoride reacts with the silica according to the equation:

$$6BF_3 + 3SiO_2 = 2(BOF)_3 + 3SiF_4$$

Both boron oxyfluoride $(BOF)_3$ and silicon tetrafluoride $(SiF_4)$ are gases, and escape from the reaction chamber along with any unreacted boron trifluoride.

The reaction chamber may take the form of a rotary kiln, a fluidizing chamber such as described in the above identified copending Kalbach et al., application, an ordinary furnace in which the magnetic fraction of the reduced flue dust is spread in thin layers in open-topped shallow receptacles, or any other suitable device for effecting intimate contact between the ferruginous material and the boron trifluoride.

Removal of silica by boron trifluoride can be effected at temperatures upward from 200° F. as illustrated by the following experiments carried out with the above described magnetic flue dust fraction. This product was placed in a steel boat disposed in the center of a Monel metal reaction tube heated to the desired temperature. Before passing boron trifluoride through said tube, the tube was purged with nitrogen for about 20 minutes. Then boron trifluoride was allowed to flow through the tube for 100 minutes. Three series of experiments were carried out, respectively, at gas flow rates of 0.0057, 0.0085 and 0.0013 cubic feet per minute. In each series, the temperature was varied as between the experiments. After the expiration of 100 minutes, nitrogen was allowed to flow for 30 minutes through the tube to purge the system, and the material was allowed to cool. Samples were taken from the cooled material, which was then magnetically concentrated by means of a laboratory electromagnet, and the sample as well as the magnetic fraction obtained were analyzed to determine their silica contents. The results show that treatment with boron trifluoride for 100 minutes at 200° F. reduced the silica content to about 5.5%; at 400° F. to about 3.4%; at 600° F. to about 2%; at 800° F. to about 1.3%; at 1000° F. to about 0.4%; at 1200° F. to about 0.3%; and at 1400° F. to about 0.2%. Magnetic treatment of the product thus treated for 100 minutes may further reduce the silica content by from 0.2 to 0.5%.

Treatment with boron trifluoride is preferably carried out at 600° F. or higher, since at lower temperatures the reaction between silica and boron trifluoride is rather slow. Complete removal of silica may be effected above 600° F., if the treatment with boron trifluoride is carried out for a sufficiently long period of time, and if provisions are made by fluidization, agitation, or otherwise, to insure intimate contact of the boron trifluoride with all parts of the finely divided ferruginous material being treated.

Only a trace of boron will be found in the treated ferruginous material. Practically no iron is lost.

The extent of silica removal can be varied according to the purity desired for the reduced product. For use in powder metallurgy, finely divided iron should contain less than 1% silica, preferably less than 0.4%. For use in charging the open hearth, reduced iron should contain at most about 2% silica. A silica content of from 10 to 12% is permissible in iron to be fed to the blast furnace.

The ferruginous material treated with boron trifluoride may be subjected to a magnetic separation, to remove small amounts of silica still present, which are then discarded. The beneficiated reduced iron containing 0.5% or less silica may be briquetted and charged to the open hearth for the production of steel.

The waste gases, which contain 2 parts by weight silicon tetrafluoride and 1 part by weight boron oxyfluoride together with any eventually unreacted boron tetrafluoride, are passed to a reaction chamber for passage through a mixture of molten sodium fluoride and molten boric oxide at 1650° F. The reaction occurring in the regeneration chamber is illustrated by the following equation:

$$3SiF_4 + 2B_2O_3 = 4BF_3 + 3SiO_2$$

Preferably some calcium fluoride is added to the regeneration chamber to replace fluoride losses.

The gases issuing from the regeneration chamber are passed through a cooler for cooling to 300° F. with resultant decomposition of boron oxyfluoride to form boric oxide and boron trifluoride. The boron trifluoride is reused for beneficiating further amounts of ferruginous material, and the boric oxide is returned to the regeneration chamber.

The solid products obtained from the regeneration chamber are treated with water, acidified water, or a dilute acid, and filtered, yielding, as a solid residue, a mixture of silica and calcium silicate together with a solution of sodium fluoride and boric acid. This solution is evaporated, if desired, to dryness, the dry solids obtained are calcined, and the evaporated solution or the solids obtained therefrom are returned to the regeneration chamber for reuse.

Figure 2:
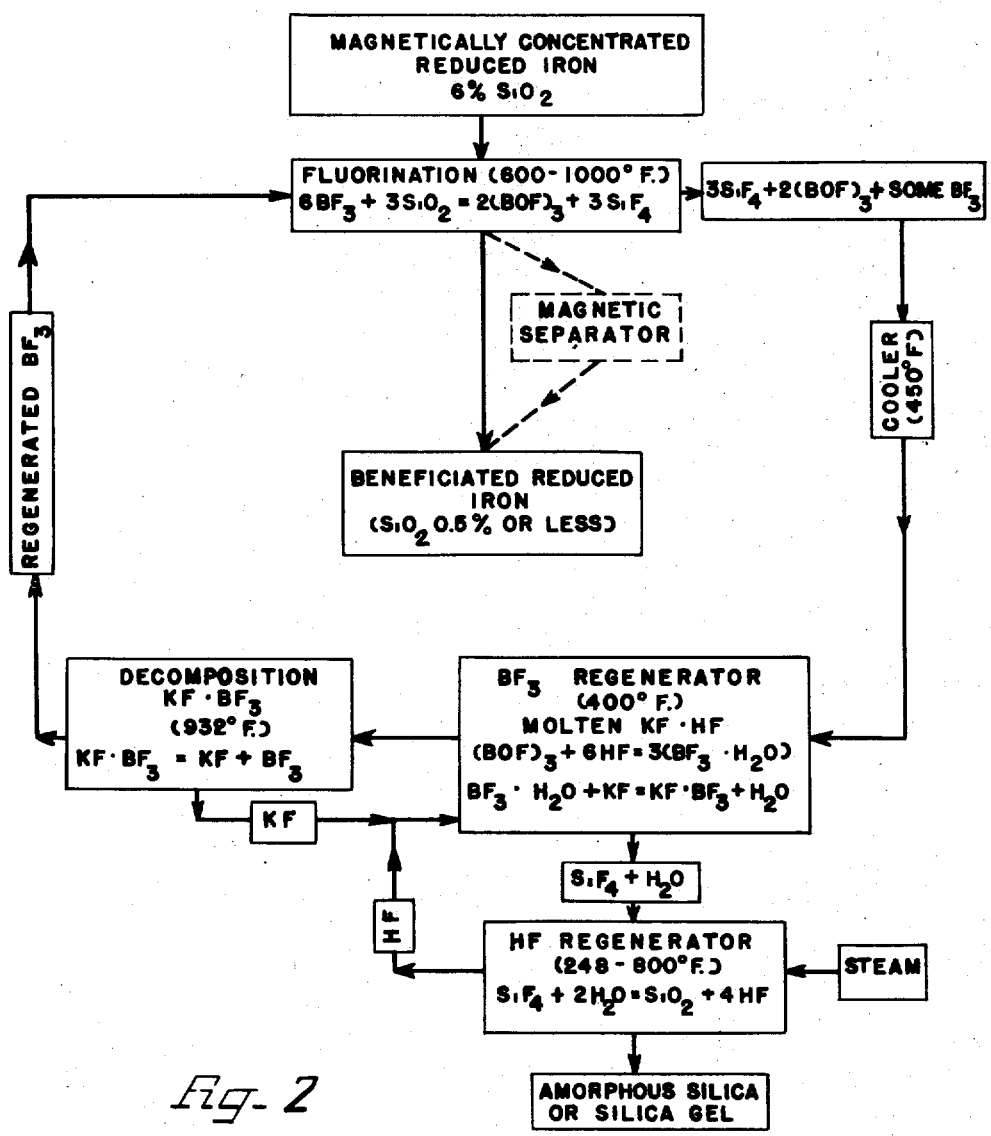
Figure 2 is a flow sheet illustrating the process of Figure 1 in which alternative means are used for regenerating the boron trifluoride and recovering the silica as amphorous silica or silica gel.

Still another regeneration process is shown in the flowsheet of Figure 2 illustrating the treatment of magnetically concentrated reduced iron containing 6% silica with boron trifluoride at, for instance, 600° F. followed by magnetic separation yielding a beneficiated reduced iron contain 0.5% or less silica. The waste gases containing 2 parts by weight silicon tetrafluoride, 1 part by weight boron oxyfluoride and some unreacted boron trifluoride are passed through a cooler for cooling to about 450° F. The cooled gases are passed to a regenerator for reaction at 400° F. with molten potassium hydrofluoride (KF.HF) according to the following equations:

$$(BOF)_3 + 6HF = 3(BF_3.H_2O)$$
$$BF_3.H_2O + KF = KF.BF_3 + H_2O$$

The $KF.BF_3$ is removed to a decomposition chamber for decomposition at, say, about 932°

F., into potassium fluoride and boron trifluoride according to the following equation:

$$KF \cdot BF_3 = KF + BF_3$$

The regenerated boron trifluoride is utilized for removal of silica from further amounts of ferruginous material, while the potassium fluoride is returned to the regeneration chamber.

The silicon tetrafluoride after passing through the regenerating chamber is admixed with water and the resulting mixture is passed to a hydrogen fluoride regeneration chamber where, at a temperature of, for instance, 248° to 800° F., the silicon tetrafluoride is decomposed with steam according to the following equation:

$$SiF_4 + 2H_2O = SiO_2 + 4HF$$

The hydrofluoric acid is returned to the first regenerating chamber, while the silica is recovered in the form of amorphous silica or silica gel.

It will be noted that the regeneration process of the first flowsheet yields silica in the form of a mixture of silica and calcium silicate; and the second regeneration process yields silica in the form of amorphous silica or, when sufficient moisture is present, in the form of silica aero gel.

Other methods for the regeneration of boron trifluoride may also be utilized.

The preceding detailed description has referred particularly to the beneficiation of flue dust. It should be understood that this description has been given merely by way of example. The removal of silica by means of boron trifluoride may be applied to other iron ores and oxides as well subsequent to reduction. The methods of this invention may be applied to the removal of elemental silicon or silicon present in ferruginous material in the form of silicides. Further, although rapid complete removal of silicic matter from ferruginous material requires that the silicic matter be easily accessible to the boron trifluoride, as in the case of finely divided or porous ferruginous material, yet superficial removal of silicic matter from larger granules or particles of ferruginous material may be successfully accomplished in relatively short time, or a complete removal by prolonged exposure to boron trifluoride.

In other words, the methods of the present invention are applicable to ferruginous materials of all kinds and containing silicon in various forms in chemical combination or mechanical admixture or conglomeration. Boron trifluoride may be used in pure or relatively pure form or in admixture with other gases such as nitrogen, carbon monoxide or air.

A very simple and inexpensive way of carrying out the method of this invention comprises incorporating with the material to be treated a fluoborate of the general formula $MF \cdot BF_3$ (M=metal), such as $CaF_2 \cdot 2BF_3$, $NaF \cdot BF_3$, $NH_4BF_3$ or the like. The resulting mixture is heated to a temperature high enough to decompose the fluoborate into $BF_3$ and a metal fluoride (MF), say, 900° F. or higher. The boron trifluoride then liberated will react with the silicic matter or other substance to be separated, and the volatile fluoride then formed can be swept away. When this method is used, the solid residue obtained will of course contain the metal fluoride component of the fluoborate originally admixed with the material being treated, but the presence of such metal fluoride is not always objectionable.

As pointed out hereinabove, boron trifluoride is applicable, not only to the separation of silicic matter from ferruginous material and the like, but also applicable to the separation from various mineral compositions of other elements and their compounds. Thus, phosphorus and its compounds may be removed from ferruginous material by treatment with boron trifluoride. For instance, when reduced flue dust is treated with boron trifluoride at temperatures of from 1000° to 1100° F., from 20 to 25% of its phosphorus content is swept away in the form of a volatile fluoride. The reaction may take place according to the following equation:

$$3P_2O_5 + 15BF_3 = 6PF_5 + 5(BOF)_3$$

The above data were obtained by treatment of magnetically concentrated reduced flue dust by methods similar to those disclosed hereinabove for the removal of silicic matter from said flue dust. Phosphorus removal is effected at temperatures as low as 700° F. and also at temperatures about 1100° F., although the efficiency is not as great as at from 1000° to 1100° F.

The phosphorus fluoride obtained may be decomposed similarly to the silicon tetrafluoride, for the purpose of regenerating boron trifluoride.

Titanium dioxide, like silicon, volatilizes when treated with boron trifluoride to form a volatile fluoride (boiling point 543° F.), in accordance with the following equation:

$$3TiO_2 + 6BF_3 = 3TiF_4 + 2(BOF)_3$$

Hence, treatment with boron trifluoride above 550° F. may be used to remove titanium from the titaniferous ores and concentrates thereof found in New York, Wyoming, Canada, Norway and Sweden, for instance, the iron ore from Cranberry, North Carolina, containing 0.17% $TiO_2$ or its concentrate containing 0.20% $TiO_2$; the magnetite from Iron Mountain, Wyoming, containing 21.9% $TiO_2$; the iron ore from Iron Mine Hill, Cumberland, Rhode Island, containing 9.30% $TiO_2$ or its concentrate containing 16.8% $TiO_2$; the iron ore from Horse Sign Butte, Curry County, Oregon, containing 4.85% $TiO_2$ or its concentrate containing 1.4% $TiO_2$; or the magnetite beach sand from Sunnybrook, Connecticut, containing 0.83% $TiO_2$ or its concentrate containing 1.53% $TiO_2$.

If desired, a treatment with boron trifluoride may be used for the purpose of recovering titanium from its ores such as ilmenite $(FeTi)_2O_3$; rutile, $TiO_2$; nelsonite, a mixture of ilmenite and apatite; or brookite, $Fe_4(TiO_4)_3$.

Treatment with boron trifluoride is likewise capable of removing vanadium from ferruginous material. Magnetite, for instance, may contain from 0.1 to 0.7% $V_2O_5$. The vanadium may react with the boron trifluoride as follows:

$$3V_2O_5 + 15BF_3 = 6VF_5 + 5(BOF)_3$$

Fluorination is carried out at a temperature higher than 400° F. The boiling point of vanadium pentafluoride is 232° F. The reaction products will be swept away from the ferruginous material by fresh fluorination gas and collected outside of the reaction chamber.

When it is desired to recover vanadium from its ores, a treatment with boron trifluoride may be applied to various vanadium ores such as roasted patronite; or carnotite, $K_2O \cdot 2UO_3 \cdot V_2O_5 \cdot 3H_2O$; or vanadinite, $3Pb_3(VO_4)_2PbCl_2$; or roscoelite, $$HgK_2(MgFe)(AlV)_4(SiO_3)_2$$

or the various vanadium ores mentioned in the article by George O. Argall in the Colorado School of Mines Quarterly, vol. 38, No. 4, October 1943, p. 56.

Treatment with boron trifluoride is also operative to volatilize as fluorides tantalum and columbium present in ores such as roasted columbite or tantalite; molybdenum from ores such as molybdenite ($MoS_2$), wulfenite ($PbMoO_4$), and molybdite ($MoO_3$); tungsten in ores such as wolframite ($FeWO_4$), scheelite ($CaWO_4$), ferberite ($FeO.WO_3$) or hubnerite [$(Mn.Fe)O.WO_3$]; or uranium from minerals such as pitchblende ($U_3O_8$) or carnotite ($K_2O2UO_3.V_2O_5.3H_2O$).

The above elements may be isolated from their ores when present not only as oxides but also in combination as simple and complex silicates, spinels, and complex mineralogical salts.

It will thus be noted that I have provided methods for the separation or removal or isolation of silicon, titanium, phosphorus, vanadium, columbium, arsenic, antimony, tantalum, molybdenum, tungsten and uranium or their oxides or other compounds thereof, by treatment of compositions containing said elements, their oxides, silicates or complex salts with boron trifluoride at a temperature above the boiling point of the fluorides of said elements. Such treatment may be used either to remove said elements and compounds thereof from material such as iron which it is desired to purify or else to isolate and recover said elements or compounds thereof.

Many details of composition and procedure may be varied within a wide range without departing from the principles of this invention, and it is, therefore, not my purpose to limit the patent granted on this invention otherwise than necessitated by the scope of the appended claims.

I claim as my invention:

1. The method of removing silicic matter from finely divided iron which comprises contacting said iron at a temperature of at least 600° F. with boron trifluoride for a time sufficient to volatilize said silicic matter in the form of silicon tetrafluoride, separating the resulting gaseous mixture from said iron, contacting the separated silicon tetrafluoride with a molten mixture of sodium fluoride and boric oxide to regenerate boron trifluoride and to form a product from which sodium fluoride and boric oxide may be extracted with water for reuse, and contacting the regenerated boron trifluoride with additional amounts of finely divided iron.

2. The method of removing silicic matter from finely divided iron which comprises contacting said iron at a temperature of at least 600° F. with boron trifluoride for a time sufficient to volatilize said silicic matter in the form of silicon tetrafluoride while also forming a substantial amount of boron oxyfluoride, separating the resulting gaseous mixture from said iron, contacting the separated gaseous mixture with a molten mixture of boric oxide and sodium fluoride to convert said silicon tetrafluoride into boron trifluoride and to form a product from which sodium fluoride and boric oxide may be extracted with water for reuse, cooling the resulting gaseous mixture to decompose said boron oxyfluoride and thereby to form additional amounts of boron trifluoride and contacting the boron trifluoride thus formed from said separated gaseous mixture with additional amounts of finely divided iron.

VINCENT S. DE MARCHI.

References Cited in the file of this patent

UNITED STATES PATENTS

| Number | Name | Date |
|---|---|---|
| 2,530,391 | De Marchi | Nov. 21, 1950 |